US008707624B2

(12) United States Patent
Gipson et al.

(10) Patent No.: US 8,707,624 B2
(45) Date of Patent: Apr. 29, 2014

(54) HEATED SLIDING WINDOW ASSEMBLY

(75) Inventors: Ron G. Gipson, Metamora, MI (US);
Charles Flynn, Davisburg, MI (US);
Brian D. Howe, Shelby Township, MI (US); Ken Keck, Clinton Township, MI (US)

(73) Assignee: Dura Operating LLC, Auburn Hills, MI (US)

( * ) Notice: Subject to any disclaimer, the term of this patent is extended or adjusted under 35 U.S.C. 154(b) by 511 days.

(21) Appl. No.: 12/335,817

(22) Filed: Dec. 16, 2008

(65) Prior Publication Data
US 2010/0146859 A1    Jun. 17, 2010

(51) Int. Cl.
*B60J 1/18*    (2006.01)

(52) U.S. Cl.
USPC ............... 49/380; 49/413; 49/118; 49/116; 219/203; 219/202; 219/522

(58) Field of Classification Search
USPC ............ 49/380, 413, 116, 118, 123; 219/202, 219/203, 214, 522, 536, 537, 211, 528, 529, 219/212
See application file for complete search history.

(56) References Cited

U.S. PATENT DOCUMENTS

| 4,410,843 | A | * | 10/1983 | Sauer et al. | 318/467 |
| 4,415,196 | A | * | 11/1983 | Baum et al. | 296/201 |
| 4,458,445 | A | * | 7/1984 | Sauer et al. | 49/26 |
| 5,363,596 | A | * | 11/1994 | Kronbetter | 49/495.1 |
| 5,531,046 | A | * | 7/1996 | Kollar et al. | 49/360 |
| 5,724,769 | A | * | 3/1998 | Cripe et al. | 49/360 |
| 5,822,922 | A | * | 10/1998 | Grumm et al. | 49/360 |
| 5,836,110 | A | * | 11/1998 | Buening | 49/360 |
| 6,014,840 | A | * | 1/2000 | Ray et al. | 49/413 |
| 6,026,611 | A | * | 2/2000 | Ralston et al. | 49/123 |
| 6,125,585 | A | * | 10/2000 | Koneval et al. | 49/349 |
| 6,223,470 | B1 | * | 5/2001 | Millard et al. | 49/374 |
| 6,324,788 | B1 | * | 12/2001 | Koneval et al. | 49/121 |
| 6,490,832 | B1 | * | 12/2002 | Fischbach et al. | 52/207 |
| 6,591,552 | B1 | * | 7/2003 | Rasmussen | 49/413 |
| 6,598,931 | B2 | * | 7/2003 | Tamura | 296/146.14 |
| 6,766,617 | B2 | * | 7/2004 | Purcell | 49/360 |
| 6,955,009 | B2 | * | 10/2005 | Rasmussen | 49/413 |
| 7,003,916 | B2 | * | 2/2006 | Nestell et al. | 49/413 |
| 7,073,293 | B2 | * | 7/2006 | Galer | 49/413 |
| 2004/0020131 | A1 | * | 2/2004 | Galer et al. | 49/413 |
| 2007/0277443 | A1 | * | 12/2007 | Dery et al. | 49/413 |
| 2008/0100152 | A1 | * | 5/2008 | Busch | 310/14 |
| 2008/0122262 | A1 | * | 5/2008 | Cicala | 296/201 |
| 2008/0202032 | A1 | * | 8/2008 | Loidolt | 49/413 |

* cited by examiner

*Primary Examiner* — Katherine Mitchell
*Assistant Examiner* — Marcus Menezes
(74) *Attorney, Agent, or Firm* — Gifford, Krass, Sprinkle, Anderson & Citkowski, P.C.; Kevin S. Mackenzie P.C.; Dean B. Watson

(57) ABSTRACT

A heated sliding window assembly for a vehicle that includes at least one fixed window. A rail is attached to the at least one fixed window. The fixed window may include an electrical contact. A sliding window is moveable along the rail and is moveable between open and closed positions. The sliding window includes a heater grid and an electrical contact. A drive mechanism is attached to the sliding window for moving the sliding window between the open and closed positions. An electrical circuit is included for carrying current to the heater grid. A switch is disposed within the electrical circuit that cuts off current to the heater grid when the sliding window is moved.

17 Claims, 9 Drawing Sheets

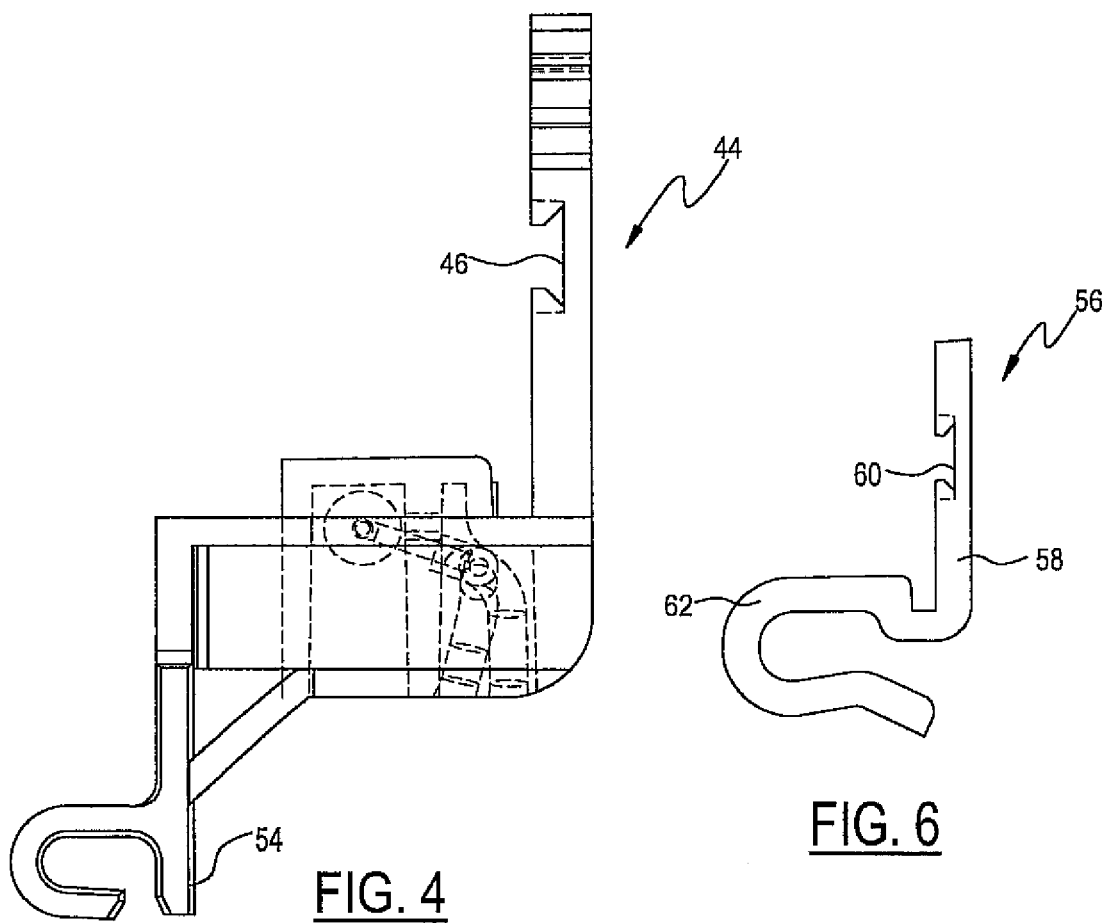
FIG. 4
FIG. 6
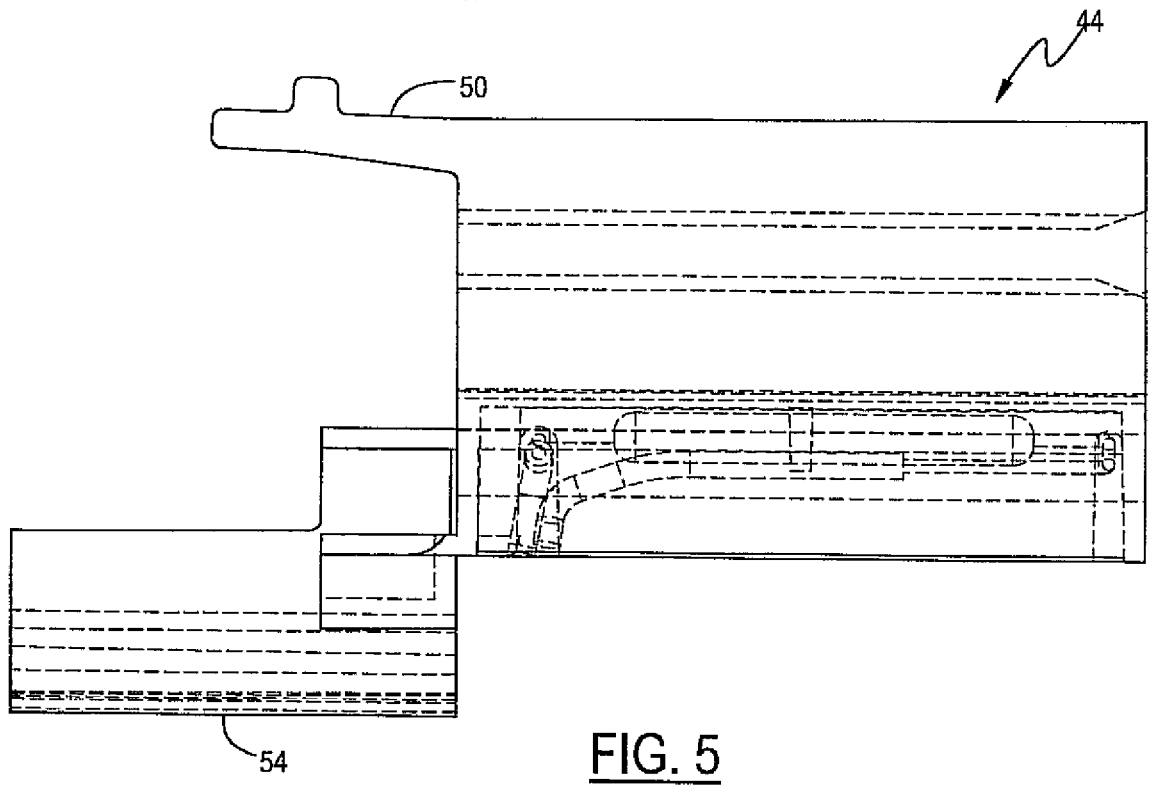
FIG. 5

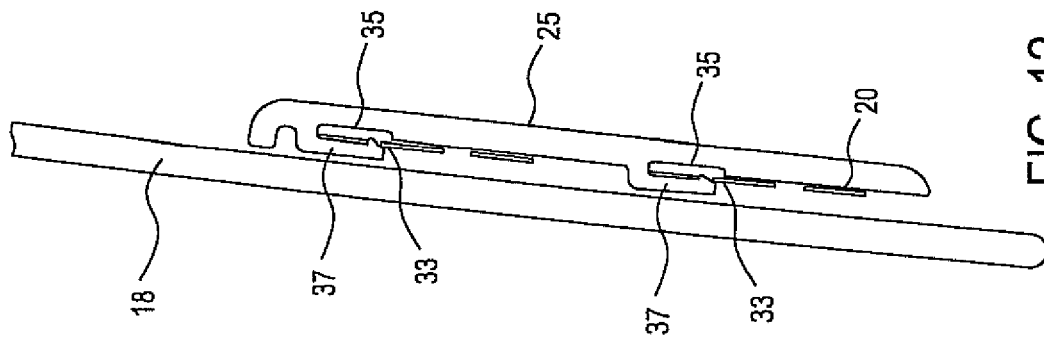
FIG. 12
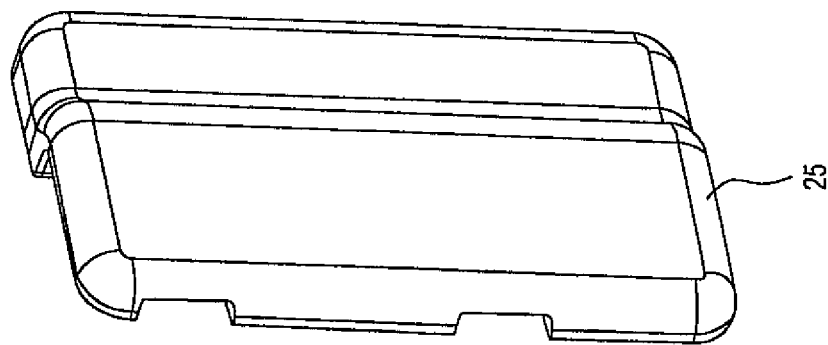
FIG. 11
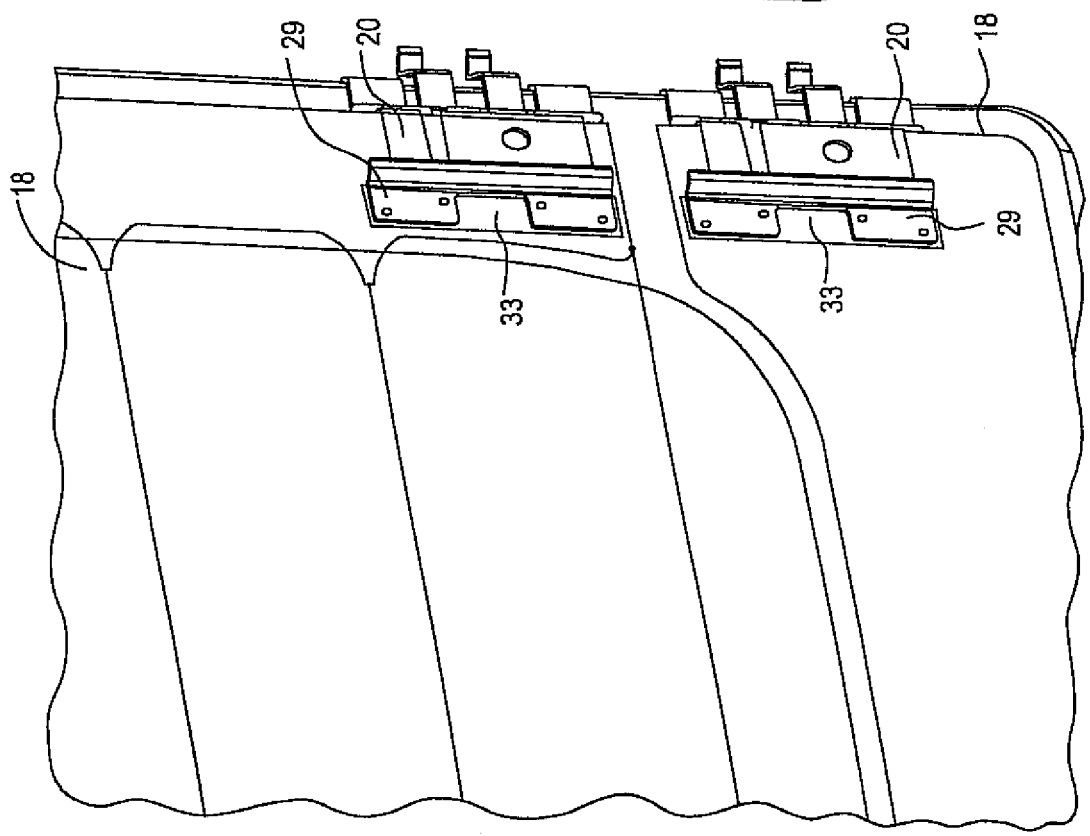

HEATED SLIDING WINDOW ASSEMBLY

FIELD OF THE INVENTION

The invention relates to a power operated vehicle window, and more particularly to a power operated sliding window that is heated for use in a motor vehicle.

BACKGROUND OF THE INVENTION

Motor vehicle window assemblies may include one or more sliding windows that move either in a horizontal or vertical direction. Various sliding window assemblies may be operated manually or may be driven by an actuator or motor.

For example, sliding window assemblies may be used as rear slider windows or back lights for pick up truck type vehicles. In such applications, the window assemblies may be housed within a frame that is positioned in an opening in a back portion of the cab of the pick up. The sliding windows may move horizontally relative to the frame to allow for opening and closing of a portion of the window assembly. Typically, such sliding window assemblies may include one or more fixed windows and a moveable window.

Sliding window assemblies may be power operated and may utilize various guide mechanisms or systems to open and close the sliding window. For example, a pull-drive system including cables that apply a pulling force to the sliding window in opposing directions to open and close the sliding window may be utilized. For example U.S. Pat. Nos. 5,724,769, 5,822,922, 6,026,611, 7,437,852 and 6,766,617 provide examples of power sliding window assemblies the disclosures of which are herein incorporated by reference in their entirety.

It is also desirable to provide the rear back light or window assembly of a pick-up truck with a defrost grid to remove fog from the windows and apply a heating force to melt ice or snow that may accumulate on the back light or window. In such a heated back light wires may be imbedded in the glass which carries an electrical current to heat the glass locally and melt or remove fog or ice and snow from the window. In such applications, the sliding window may include contacts that are linked with a fixed window to transmit electrical current from a power source to the various windows of the window assembly. However, it is desirable to have the defrost current disabled when the sliding window is being moved to an open position to prevent an arc being formed between the gap between contacts of the sliding window and the fixed window. There is therefore a need in the art for a heated sliding window assembly including a defrost grid on one or more fixed windows and a movable window such that current is cut off when the sliding window opens.

SUMMARY OF THE INVENTION

In one aspect, there is provided a heated sliding window assembly for a vehicle that includes at least one fixed window. A rail is attached to the at least one fixed window. The fixed window may include an electrical contact. A sliding window is moveable along the rail and is moveable between open and closed positions. The sliding window includes a heater grid and an electrical contact. A drive mechanism is attached to the sliding window for moving the sliding window between the open and closed positions. An electrical circuit is included for carrying current to the heater grid. A switch is disposed within the electrical circuit that cuts off current to the heater grid when the sliding window is moved.

In another aspect, there is provided a heated sliding window assembly for a vehicle that includes at least one fixed window. A rail is attached to the at least one fixed window. A sliding window is moveable along the rail and is moveable between open and closed positions. The sliding window includes a heater grid. An electrical circuit is included for carrying current to the heater grid. A switch is disposed within the electrical circuit that cuts off current to the heater grid when the sliding window is moved.

BRIEF DESCRIPTION OF THE DRAWINGS

FIG. 4 is a side view of one embodiment of a switch and housing;

FIG. 5 is an enlarged front view of a portion of the switch and housing of FIG. 4;

FIG. 6 is a side view of a wire clip that engages a rail of the heated sliding window assembly;

FIG. 11 is a partial perspective view of a fixed widow including contacts and a contact cover;

FIG. 12 is a partial sectional view of a fixed widow including contacts and a contact cover.

DETAILED DESCRIPTION OF THE PREFERRED EMBODIMENTS

Figure 1:
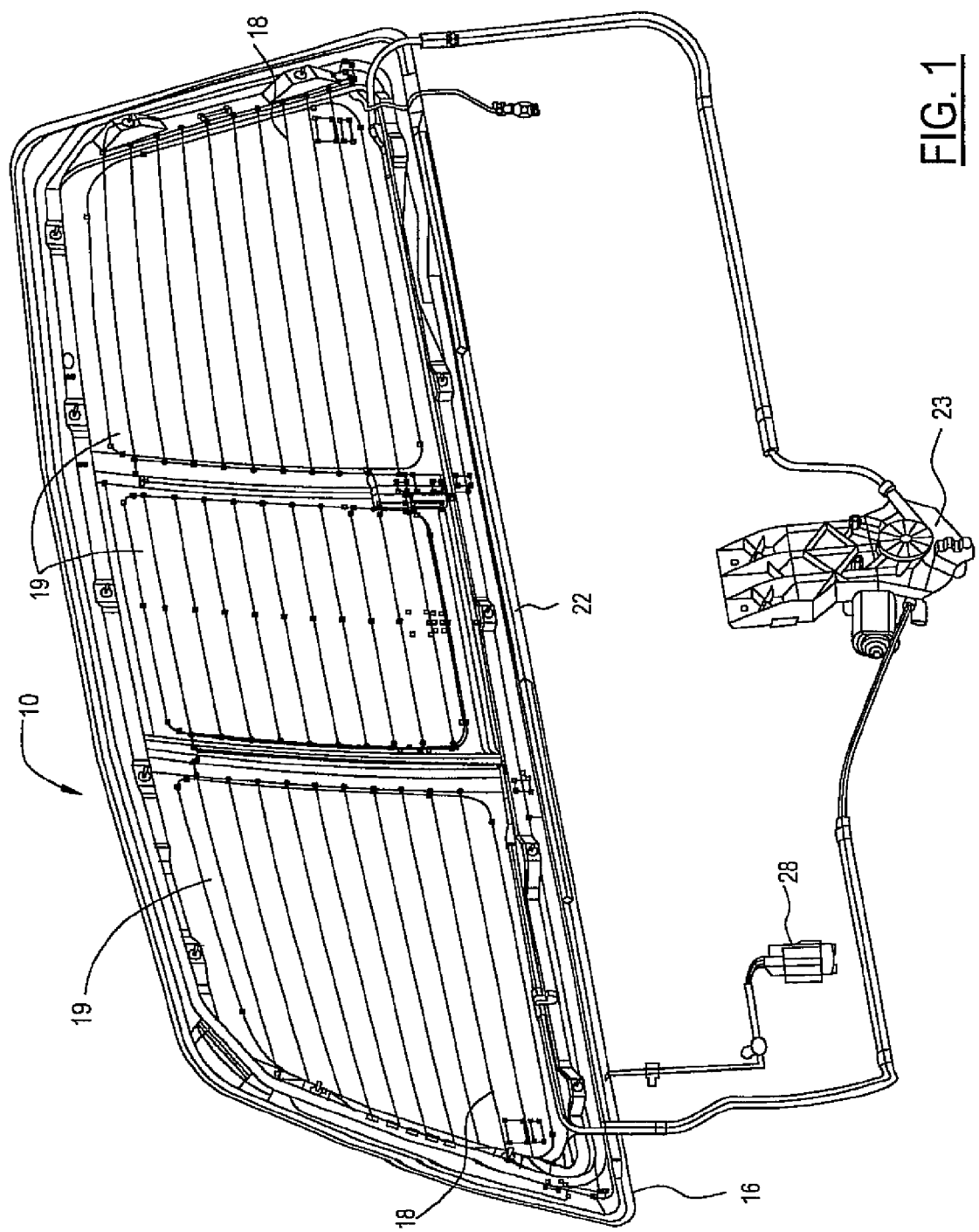
FIG. 1 is a perspective view of a heated sliding window assembly including a window frame, an actuator, and an electrical connection providing current to the heated defroster grid.
Figure 2:
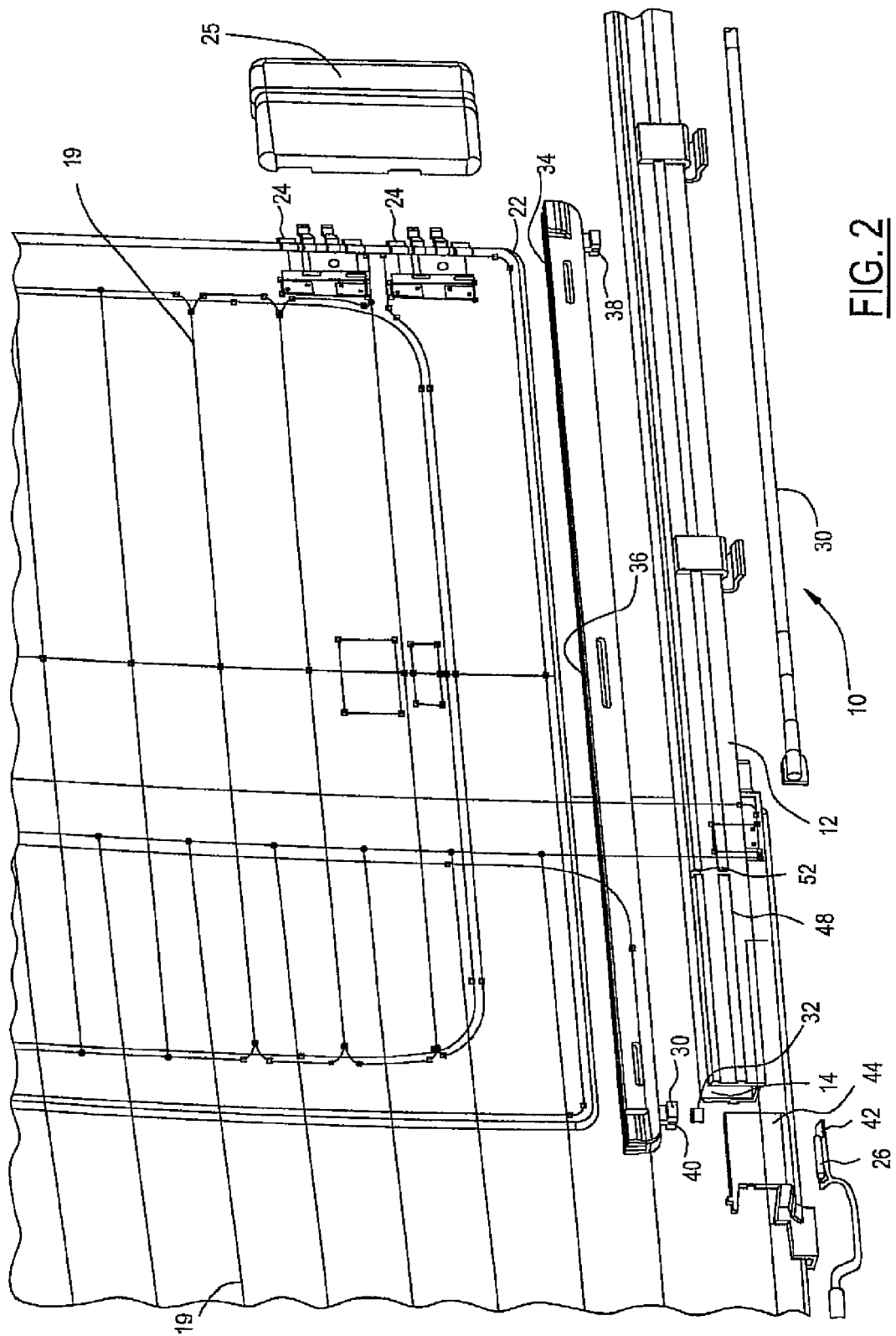
FIG. 2 is a partial exploded perspective view of the heated sliding window assembly including a portion of the fixed window and a portion of the sliding window including the rail, guide bracket and switch.
Figure 3:
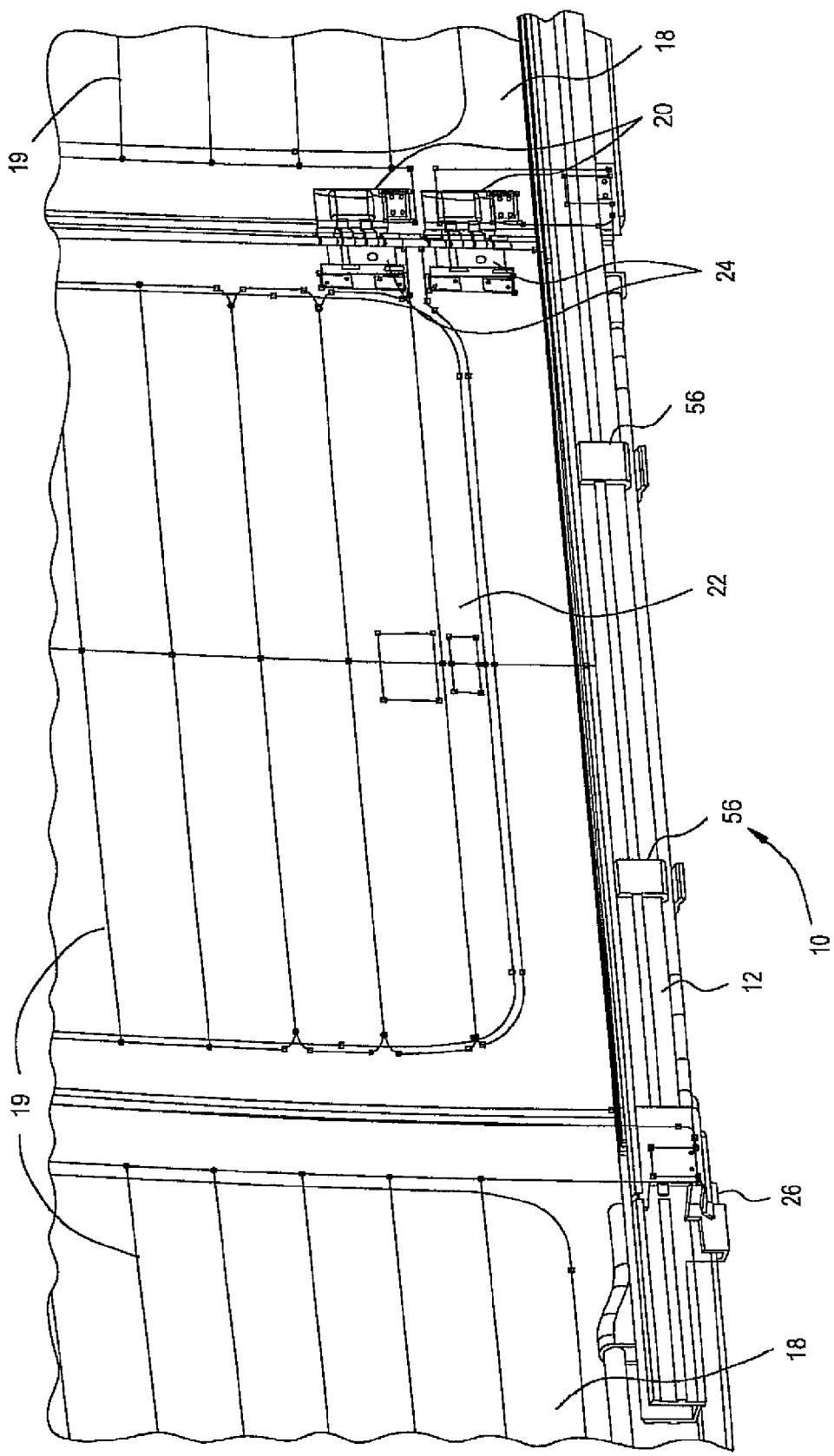
FIG. 3 is a partial perspective view of the heated sliding window assembly of FIG. 2 assembled.

Referring to FIGS. 1-3, there is shown one embodiment of a heated sliding window assembly 10 for a vehicle. The heated sliding window assembly 10 may be utilized in various positions on a vehicle. The following detailed description of various embodiments will be given with reference to a power heated sliding window assembly positioned in an opening in a back of a motor vehicle such that the window assembly includes a sliding window that slides horizontally within a window frame. It should be understood that various other orientations and movements may be utilized.

The heated sliding window assembly 10 may include a rail 12 that is attached to the vehicle. The rail 12 may include a channel 14 formed therein. The rail 12 may be attached to either an upper or lower portion of the window frame 16 with the rail 12 depicted on the lower portion of the frame 16 in FIG. 1. A heated sliding window assembly 10 may also include at least one fixed window 18 that is affixed to the vehicle. The fixed window 18 may include an electrical contact 20. A sliding window 22 may be positioned in the rail 12. The sliding window 22 is moveable between open and closed positions. The sliding window 22 may include an electrical contact 24 that engages and disengages the contact 20 attached to the at least one fixed window 18 in the closed and open positions respectively. The sliding window may also include a heater grid 25. A drive mechanism 23 may be linked with the sliding window 22 for moving the sliding window 22 between the open and closed positions. Various drive mechanisms 23 may include pull-pull cable systems as well as other mechanized drive assemblies.

An electrical circuit may be provided for carrying current to the heater grid 19. A switch 26 may be included in the electrical circuit that cuts off current to the heater grid 19 when the sliding window 22 is moved. The switch 26 or a sensor 64 associated with the electrical circuit detects movement of the sliding window 22 and provides a signal that cuts off electrical current that is routed to the contacts 20, 24 on the fixed and sliding windows 18, 22 before the contact 24 on the sliding window 22 disengages from the contact 20 on the fixed window 18. The electrical current that is routed to the contacts 20, 24 maybe distributed through the fixed and sliding windows 18, 22 to act as a defrost or fog clearing mechanism on a window assembly. As shown in the embodiment of FIG. 1, the fixed and sliding windows 18, 22 include a heater grid 19 including a conducting element such as wires, a film, a conductive paint or various other types of elements positioned thereon that receive electrical current from a connection 28 and heat to remove fog or snow or ice or other materials from the fixed and sliding windows 18, 22.

In the depicted embodiment of FIG. 1, the at least one fixed window 18 includes two fixed windows 18 that are attached to the vehicle. As shown in FIG. 1, the electrical current is routed from the connection 28 to a first of the fixed windows 18 which is connected to the second fixed window 18 via a jumper cable 30 disposed below the rail 12. The sliding window 22 is connected to the second fixed window 18 via the electrical contact 20 on the fixed window 18 and the electrical contact 24 on the sliding window 22. In this manner, electrical current is routed through the various fixed and sliding windows 18, 22 to provide a heated sliding window assembly 10.

Referring to FIG. 2, the heated sliding window assembly 10 may include a magnet 32 that is attached to the sliding window 22. In the depicted embodiment of FIG. 2, the sliding window 22 is positioned in a guide bracket 34 positioned in the channel 14 formed in the rail 12. The guide bracket 34 may include a slot 36 formed therein that receives the sliding window 22. The guide bracket 34 may include various formations 38 thereon, such as the legs extending from the guide bracket 34, as depicted in FIG. 2, which are positioned within the rail 12 and act as a guide for the lateral movement of the sliding window 22 within the rail 12. In the depicted embodiment of FIG. 2, the magnet 32 is positioned in a slot 40 formed on an end of the guide bracket 34 within one of the formations 38 formed on the bottom of the guide bracket 34.

Figure 10:
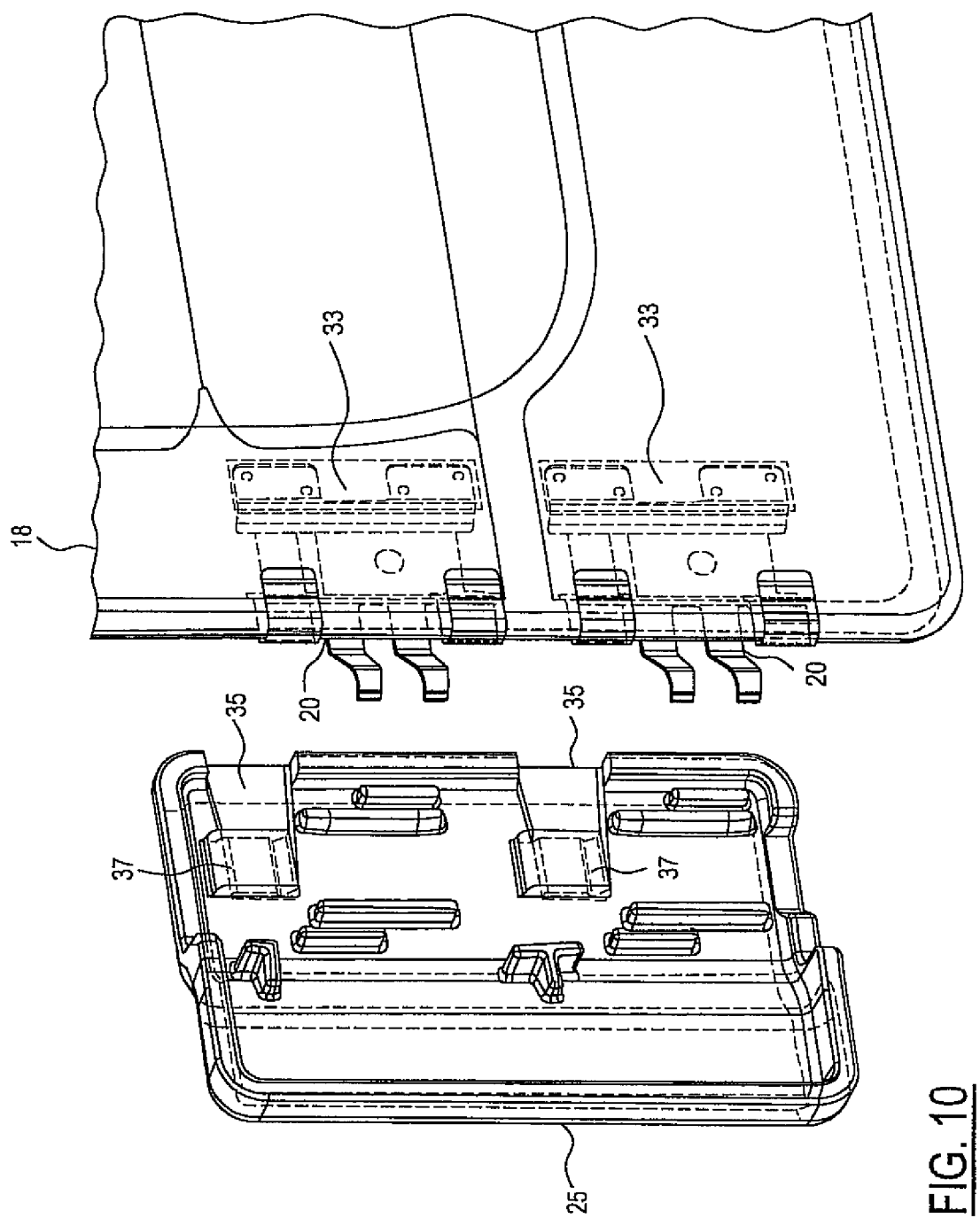
FIG. 10 is a partial perspective view of a fixed widow including contacts and a contact cover.

In one aspect, the contacts 20, 24 may include a cover 25, as best shown in FIGS. 10, 11 and 12. The cover 25 may be formed of any appropriate material including thermoplastic type materials. The electrical contacts 20 on the fixed window 18 may include a raised surface 29 creating a space between the fixed window 18 and the contacts 20. The contacts 20 may also include a retention slot 33. The cover 25 may include retention legs 35 that are received by the raised surface 29 of the contacts 20. As the retention legs 35 of the cover 25 are fully positioned in the raised surface 29 of the contacts 20, a snap feature 37 of the retention legs 35 engages the retention slot 33 formed in the raised surface 29, as best seen in FIG. 12 to complete the attachment of the cover 25 to the contacts 20 on the fixed window 18.

In one aspect, the switch 26 may include a reed switch 42 that is attached to the rail 12. The reed switch 42 may include a housing 44 that has a dovetail slot 46 formed thereon, as best shown in FIGS. 4 and 5. The dovetail slot 46 may mate with a corresponding feature 48 formed on the rail 12 allowing the housing 44 to slide on the rail 12. Additionally, the housing 44 may include a spring arm 50 again shown in FIGS. 4 and 5 that engages a notch 52 formed on the rail 12 to position the housing 44 on the rail 12. The housing 44 may also include a wire routing extension 54 for positioning a wire relative to the rail 12. In this manner, the routing extension 54 positions the wire such that it is not pinched in the rail 12 or otherwise damaged when assembling the rail 12 and guide bracket 34.

Referring to FIGS. 2 and 6, the heated sliding window assembly 10 may also include at least one wire clip 56 that is attached to the rail 12 for positioning wires associated with the heated sliding window assembly 10. In one aspect, the wire clip 56 may include a body 58 that has a dovetail slot 60 formed thereon that mates with the corresponding feature 48 formed on the guide rail 12 enabling the wire clip 56 to slide on the rail 12. In one aspect, the body 58 includes a hook shaped retaining section 62 for housing a wire.

Figure 7:
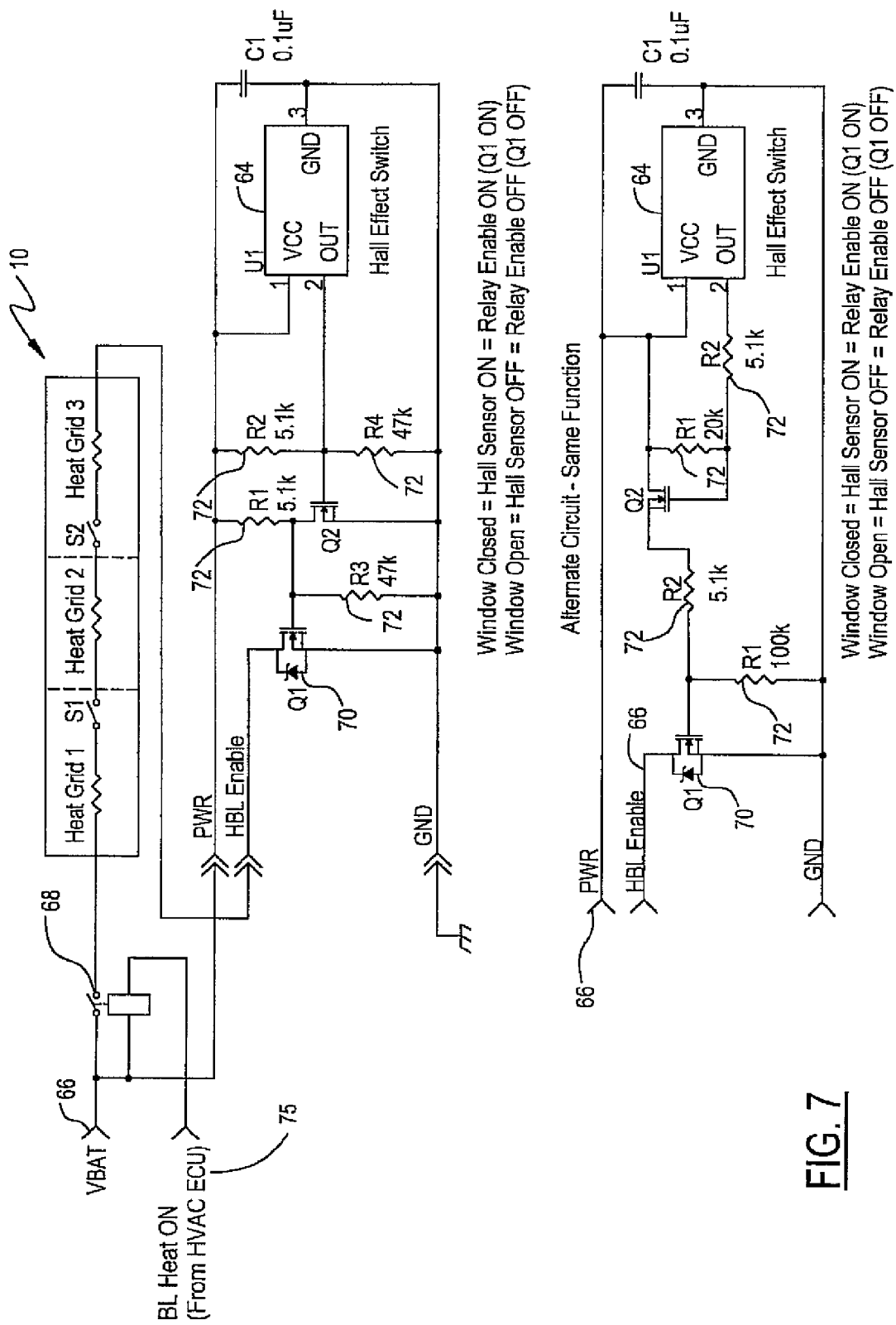
FIG. 7 is a schematic diagram of various circuit designs for a heated sliding window assembly that includes a relay and transistor.
Figure 8:
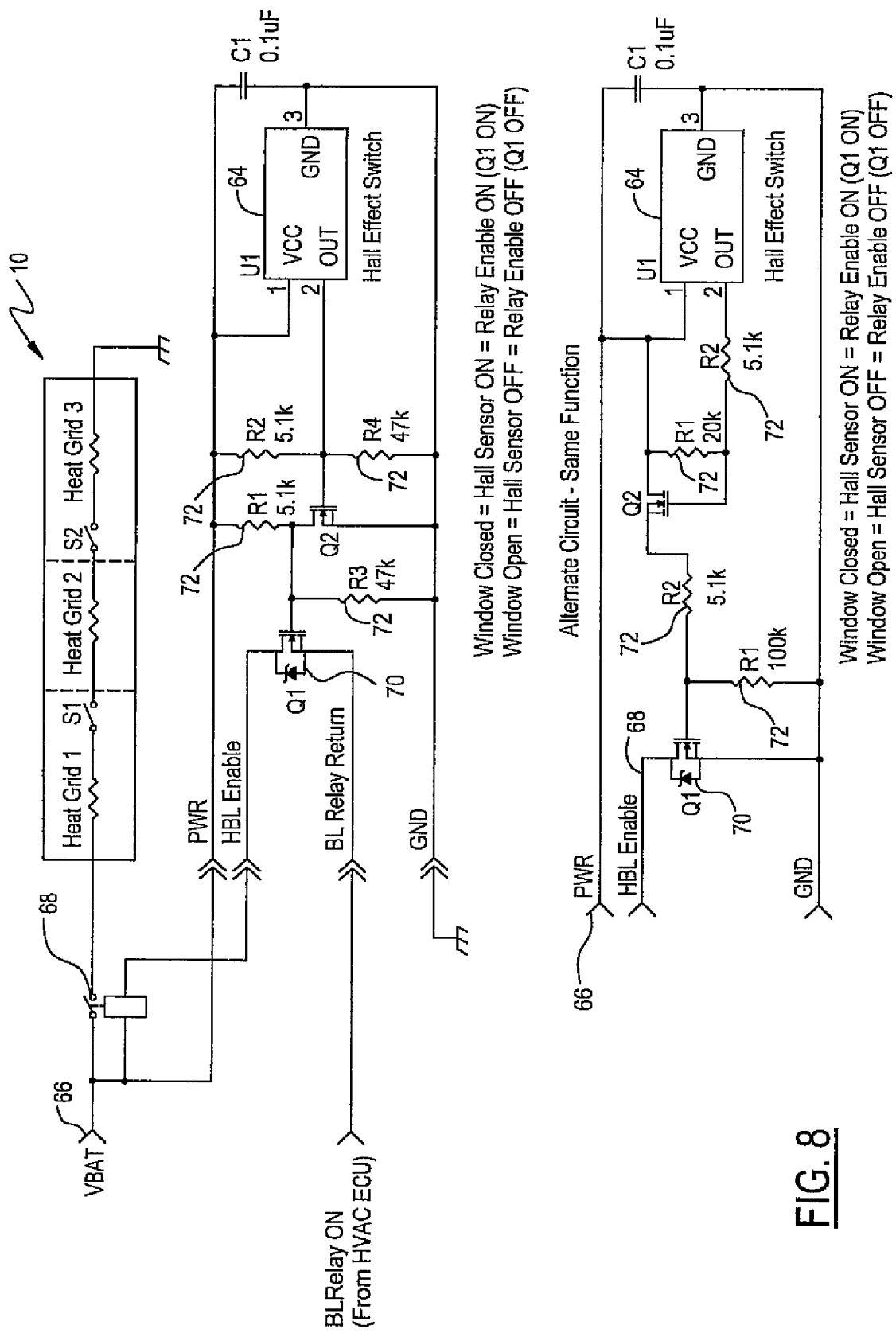
FIG. 8 includes schematics of a wiring system for a heated sliding window assembly including a relay and transistors.
Figure 9:
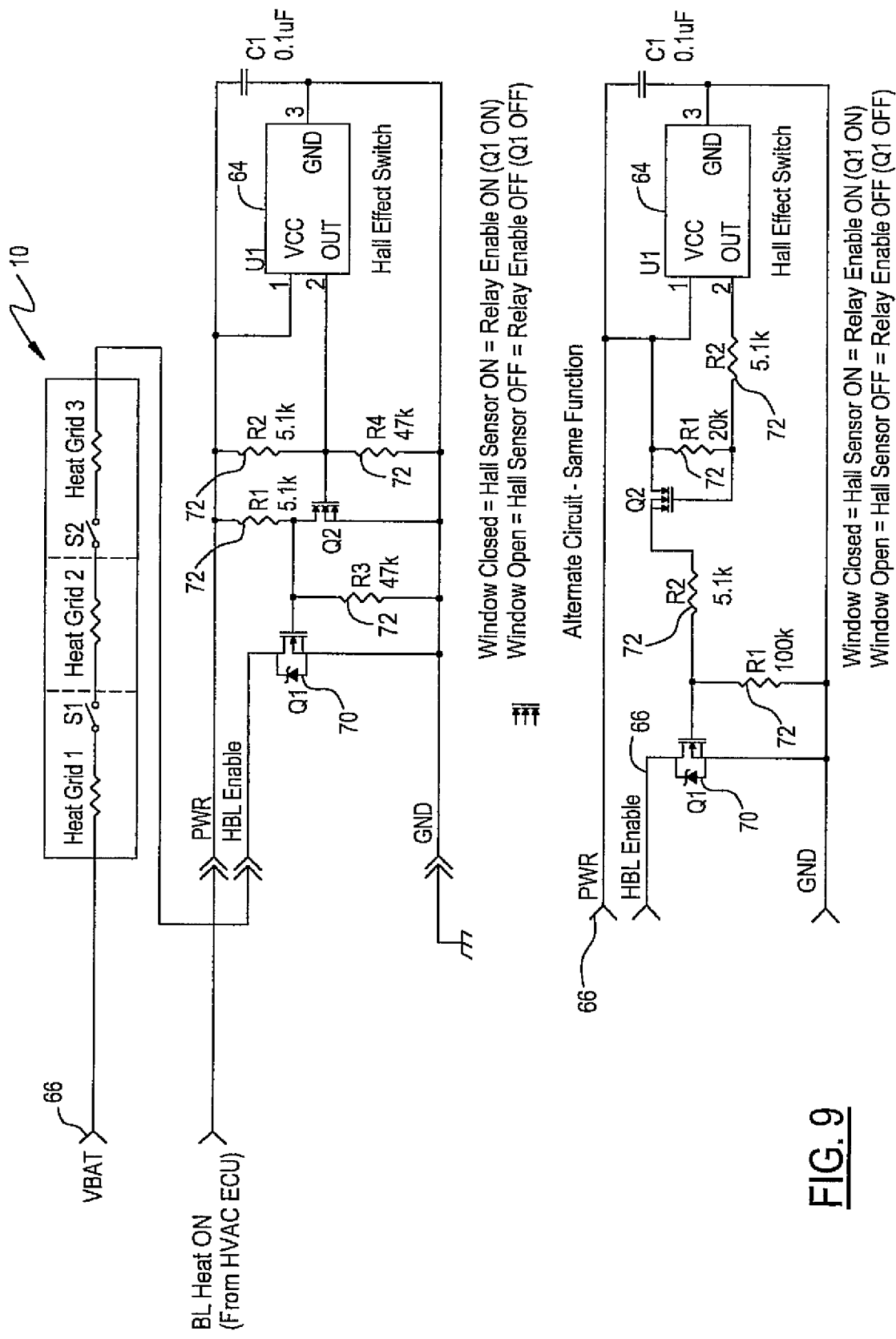
FIG. 9 includes wiring schematics of a heated sliding window assembly including a transistor.

In an alternative embodiment, the electrical circuit may include a Hall effect sensor 64. Referring to FIGS. 7 through 9, various circuits for the heating sliding window assembly 10 are presented. In one aspect, the Hall effect sensor 64 may be connected to a circuit including a power source 66 and a relay 68 providing current to the heated sliding window assembly 10. The Hall effect sensor 64 sends a signal to a transistor 70 linked with the relay 68 on a ground side of the heated sliding window assembly 10 to turn the transistor 70 on and off wherein the transistor completes or opens the circuit thereby cutting off electrical current to the contacts 20, 24. In the depicted embodiment, the transistor Q2 drives transistor Q1 or the output transistor. The transistor 70 is in series with the relay and the transistor is powered directly by the power source 66. Various transistors may be utilized including FETs, BJTs or other transistors. Additionally, various resistors 72 may be positioned relative to the transistors 70 to bias the transistors 70 as needed. Further, in the depicted embodiments of FIG. 7 the resistors 72 may have various values such that a change in the values may allow adaptations to a specific application. Various values of the resistors 72 may be utilized.

Referring to FIG. 8, there is shown another electrical circuit in which the Hall effect sensor 64 is connected to a circuit including a power source 66 and a relay 68 providing current to the heated sliding window assembly 10. The Hall effect sensor 64 sends a signal to the transistor 70 linked with the relay 68 on a ground side of the coil on relay 68 to turn the transistor 70 on and off wherein the transistor 70 completes or opens the circuit. The transistor 70 completes the circuit for the relay coil which closes the relay contacts allowing current to flow to the heated sliding window assembly 10. As with the embodiment shown in FIG. 7, different resistors 72 and relays 68 as well as various types of transistors 70 may be utilized. Again, the values of the resistors 72 of the depicted embodiments of FIG. 8 may be changed without departing from the invention to tailor the electrical system for specific applications.

Referring to FIG. 9, there is shown another embodiment wherein the Hall effect sensor 64 is connected to a circuit having a power source 66 connected to the heated sliding window assembly 10. The Hall effect sensor 64 sends a signal to a transistor 70 linked with a ground side of the heated sliding window assembly 10 to turn the transistor 70 on and off wherein the transistor 70 completes or opens the circuit. As with the depicted embodiments of FIGS. 7 and 8 there are shown different schematics and resistors 72 to bias the various transistors 70. It should be realized that the values of the resistors 72 and positioning of the various components may be changed to tailor the electrical system for a specific application. In another aspect, the Hall effect sensor 64 may be interchanged with the reed switch 42 as described above. The reed switch 42 may be connected on the ground or power side of the relay coil providing power to the heater grid 19. Alternately, the reed switch 42 may be connected to provide a signal to a window heater grid controller 75. The window heat grid controller 75 would enable or disable power to the heater grid 19 based on the state of the reed switch 42 signal.

In use, the heated sliding window assembly 10 may be assembled such that the guide bracket 34 is attached to the sliding window 22. The guide bracket 34 may be positioned in the rail 12 for movement between open and closed positions. The contacts 24 on the sliding window 22 engage the contacts 20 on the at least one fixed window 18 when in the closed position. A magnet 32 may be attached to the sliding window 22 such that it moves with the sliding window 22. In this manner, the reed switch 42 or a Hall effect sensor 64 detects the magnetic field of the magnet 32 to determine movement of the sliding window 22 and cuts off electrical current routed to the contacts 20, 24. In this manner, electrical current is shut off prior to disengagement of the contacts 20, 24 such that a arc or spark is not formed between the gap between the contacts 20, as the sliding window 22 moves away from the at least one fixed window 18.

The invention claimed is:

1. A heated sliding window assembly for a vehicle comprising:
   at least one fixed window;
   a rail attached to the fixed window, the fixed window including an electrical contact;
   a sliding window moveable along the rail, the sliding window moveable between open and closed positions, the sliding window including an electrical contact and including a heater grid;
   a drive mechanism attached to the sliding window for moving the sliding window between the open and closed positions;
   an electrical circuit for carrying current to the heater grid;
   a switch separate and distinct from the electrical contacts of the fixed and sliding windows, the switch disposed within the electrical circuit and wherein the switch detects movement of the sliding window and cuts off current to the heater grid when the sliding window is moved before disengagement of the electrical contacts of the fixed and sliding windows when in the closed position, wherein the switch includes a reed switch attached to the rail.

2. The heated sliding window assembly of claim 1 including a magnet attached to the sliding window.

3. The heated sliding window assembly of claim 1 including a frame mountable in an opening of the vehicle, the rail and at least one fixed window attached to the frame.

4. The heated sliding window assembly of claim 1 including a guide bracket positioned in a channel formed in the rail, the guide bracket having a slot formed therein, the slot receiving the sliding window.

5. The heated sliding window assembly of claim 1 wherein the reed switch includes a housing having a dove tail slot formed therein that mates with a corresponding feature formed on the rail enabling the housing to slide on the rail and wherein the housing includes a spring arm that engages a notch formed on the rail for positioning the housing on the rail.

6. The heated sliding window assembly of claim 5 wherein the housing includes a wire routing extension for positioning a wire relative to the rail.

7. The heated sliding window assembly of claim 1 wherein the reed switch is positioned on a ground side of the electrical circuit of the heated sliding window wherein the reed switch opens and closes to open and complete the electrical circuit allowing transmission of current and stopping transmission of current to the fixed and sliding windows.

8. A heated sliding window assembly for a vehicle comprising:
   at least one fixed window, the fixed window including an electrical contact;
   a rail attached to the fixed window;
   a sliding window moveable along the rail, the sliding window moveable between open and closed positions, the sliding window including a heater grid, and the sliding window including an electrical contact;
   an electrical circuit for carrying current to the heater grid;
   a switch separate and distinct from the electrical contacts of the fixed and sliding windows, the switch disposed within the electrical circuit and wherein the switch detects movement of the sliding window and cuts off current to the heater grid when the sliding window is moved before disengagement of the electrical contacts of the fixed and sliding windows when in the closed position, wherein the electrical circuit includes a hall effect sensor linked with the switch.

9. The heated sliding window assembly of claim 8 wherein the hall effect sensor is connected to the circuit including a power source and a relay providing current to the heated sliding window assembly, the hall effect sensor sending a signal to a transistor linked with the relay on a ground side of the heated sliding window to turn the transistor on and off wherein the transistor completes or opens the circuit.

10. The heated sliding window assembly of claim 8 wherein the hall effect sensor is connected to the circuit including a power source and a relay providing current to the heated sliding window assembly, the hall effect sensor sending a signal to a transistor linked with the relay on a ground side of a relay coil to turn the transistor on and off wherein the transistor completes or opens the circuit.

11. The heated sliding window assembly of claim 8 wherein the hall effect sensor is connected to the circuit having a power source connected to the heated sliding window assembly, the hall effect sensor sending a signal to a transistor linked with a ground side of the heated sliding window circuit to turn the transistor on and off wherein the transistor completes or opens the circuit.

12. The heated sliding window assembly of claim 8 including an electrical contact positioned on the sliding window that engages and disengages another electrical contact attached to the at least one fixed window in the closed and open positions respectively.

13. The heated sliding window assembly of claim 8 including a drive mechanism attached to the sliding window for moving the sliding window between the open and closed positions.

14. The heated sliding window assembly of claim 8 including a magnet attached to the sliding window.

15. The heated sliding window assembly of claim 14 wherein the hall effect sensor detects the magnetic field of the magnet identifying movement of the sliding window and providing a signal to cut off current routed to the heater grid.

16. The heated sliding window assembly of claim 8 including at least one wire clip attached to the rail for positioning wires associated with the heated sliding window assembly.

17. The heated sliding window assembly of claim 16 wherein the wire clip includes a body having a dove tail slot formed therein that mates with a corresponding feature formed on the rail enabling the wire clip to slide on the rail, and the body including a hook shaped retaining section for housing a wire.

* * * * *